United States Patent Office.

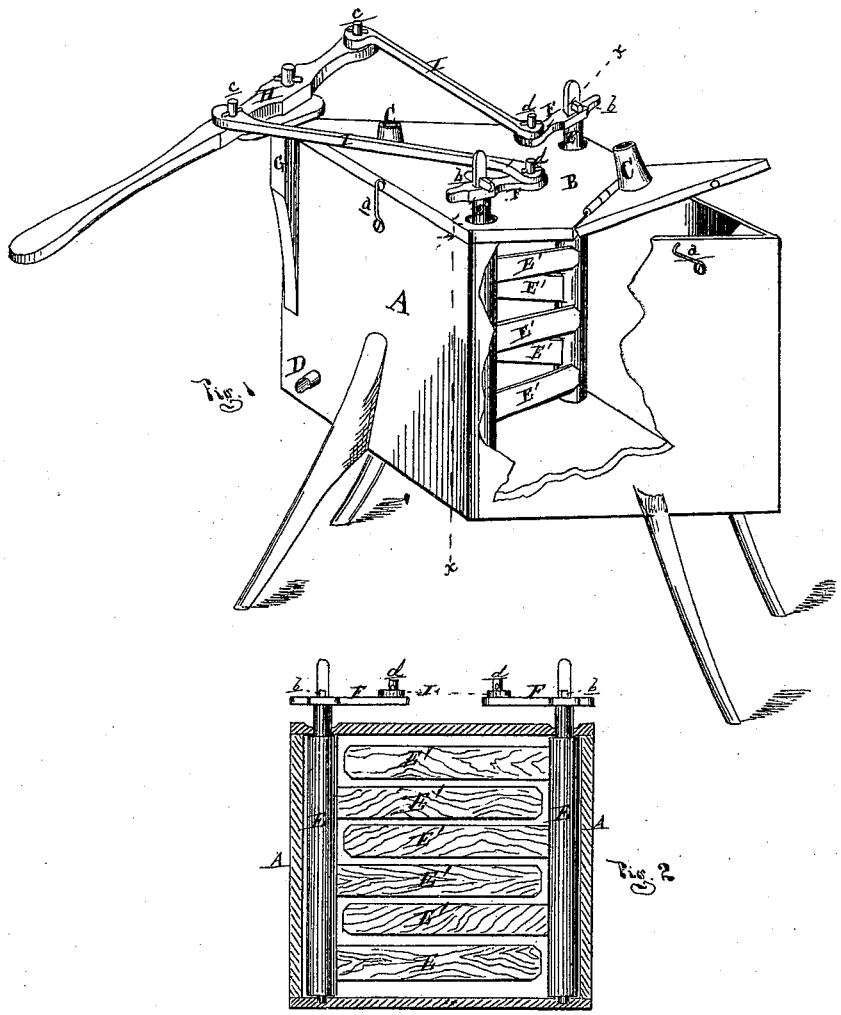

DAVID FRANKFODER, OF WAKARUSA, INDIANA.

Letters Patent No. 112,796, dated March 21, 1871.

IMPROVEMENT IN CHURNS.

The Schedule referred to in these Letters Patent and making part of the same.

*To whom it may concern:*

Be it known that I, DAVID FRANKFODER, of Wakarusa, in the county of Elkhart and State of Indiana, have invented a new and useful Improvement in Churns; and I do declare that the following is a true and accurate description thereof, reference being had to the accompanying drawing and to the letters of reference marked thereon and being a part of this specification, in which—

Figure 1 is a perspective view of my improved churn, with one of the walls partially broken away to show the interior arrangement of the dashers; and Figure 2 is a cross-section on the line $x\,x$ in fig. 1.

Like letters indicate like parts in each figure.

The nature of this invention relates to an improved construction of churns, and

It consists in the combination of the operative portions thereof, all constructed and arranged as more fully hereinafter set forth.

In the drawing—

A represents a diamond-shaped box, forming the body of my churn, mounted on suitable legs, provided with a lid, B, in two sections, hinged together and secured thereto by hooks $a$, as shown.

C are tubes inserted in openings in the lid, above which they project, serving to admit air to the churn, and preventing the cream from splashing out while churning.

D is a plug in the lower part of the churn-body, for emptying it of buttermilk or the rinsing-water after churning.

E are rock-shafts stepped in the bottom of the churn-body in the obtuse angles thereof, while their upper ends project through suitable openings in the lid, which openings form their boxes or bearings.

On each rock-shaft is a series of beaters, E', projecting nearly across the box, those of each rock-shaft alternating with those of the other, passing between them in the vibrations of said rock-shafts. The beaters form the dashers of the churn.

The upper ends of the rock-shafts are squared to receive the rocker-arms F, detachably secured thereon by the keys $b$, or their equivalents.

At one end of the churn-body is erected a standard, G, on which is sleeved a lever, H, provided with two studs, $c$, one at each side of the fulcrum G, and equidistant therefrom.

I are connecting-rods, pivoted at one end to the studs $c$ of the lever, and at the other to wrist-pins $d$, at the ends of the rocker-arms, so that, by vibrating the lever H, the dashers will be vibrated in opposite directions, their beaters passing between each other, thoroughly agitating the cream and breaking the globules, to set free their fatty matter, when, if the cream be of the right temperature, butter will come in three to five minutes.

After the butter comes the buttermilk can be drawn off by taking out the plug D, when the butter can be thoroughly worked, either with or without water, by vibrating the beaters as in churning.

It will be seen, on reference to the drawing, that the lid and the working parts may be quickly detached from the churn-box for removing the butter and cleansing the churn.

What I claim as my invention, and desire to secure by Letters Patent, is—

The combination of the beaters E', rock-shafts E, rocker-arms F, connecting-rod I, lever H, and standard G, arranged with relation to each other and the churn-box A, and detached lid A', as and for the purpose set forth.

DAVID FRANKFODER.

Witnesses:
 AMOS STEALY,
 ISAAC L. NORRIS.